US012277344B2

United States Patent
Darapureddy et al.

(10) Patent No.: US 12,277,344 B2
(45) Date of Patent: Apr. 15, 2025

(54) FLASH INTERFACE WITH SWITCHING LOGIC

(71) Applicant: Western Digital Technologies, Inc., San Jose, CA (US)

(72) Inventors: Narendra Darapureddy, Vepada (IN); Jacob Albons, Bangalore, IN (US); Ramanathan Muthiah, Bangalore (IN); Rajesh Neermarga, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 14 days.

(21) Appl. No.: 18/218,866

(22) Filed: Jul. 6, 2023

(65) Prior Publication Data
US 2024/0329880 A1    Oct. 3, 2024

Related U.S. Application Data

(60) Provisional application No. 63/455,395, filed on Mar. 29, 2023.

(51) Int. Cl.
  *G06F 3/06* (2006.01)
(52) U.S. Cl.
  CPC .......... *G06F 3/0659* (2013.01); *G06F 3/0619* (2013.01); *G06F 3/0679* (2013.01)
(58) Field of Classification Search
  CPC .... G06F 3/0659; G06F 3/0619; G06F 3/0679; G06F 3/061; G06F 3/0611; G06F 3/0613; G06F 3/0647; G06F 12/053; G06F 2212/7205
  See application file for complete search history.

(56) References Cited

U.S. PATENT DOCUMENTS

| | | | |
|---|---|---|---|
| 9,152,496 B2 | 10/2015 | Kanade et al. | |
| 9,158,621 B2 | 10/2015 | Sharon et al. | |
| 10,534,729 B1 | 1/2020 | Maidee et al. | |
| 10,642,513 B2 | 5/2020 | Marcu et al. | |
| 10,971,215 B1 | 4/2021 | Yang et al. | |
| 11,113,222 B2 | 9/2021 | Law | |
| 2020/0142849 A1* | 5/2020 | Law | G06F 13/40 |
| 2021/0294739 A1* | 9/2021 | Oh | G06F 9/546 |
| 2022/0028475 A1 | 1/2022 | Sharon et al. | |
| 2022/0058140 A1 | 2/2022 | Zimmerman et al. | |
| 2022/0121375 A1* | 4/2022 | Kim | G06F 3/0616 |
| 2022/0308769 A1 | 9/2022 | Muthiah et al. | |
| 2024/0028249 A1* | 1/2024 | Confalonieri | G06F 3/0679 |

(Continued)

*Primary Examiner* — Tracy A Warren
(74) *Attorney, Agent, or Firm* — PATTERSON + SHERIDAN, LLP (57) ABSTRACT

There is a large latency and controller bandwidth associated with moving data between dies or between memory devices. The controller includes one or more flash interface modules (FIMs) that are utilized to write data to the memory device and read data from the memory device. Each of the one or more FIMs includes one or more switches. Each switch is utilized to transfer data from a source block to a destination block. Likewise, rather than using a memory external to the FIM to cache the data, the data is stored in a FIM cache and moved from the FIM cache to the relevant physical layer to be programmed to the destination block. Because data is not being transferred to the system memory, the latency and bandwidth associated with relocating data may be decreased.

20 Claims, 9 Drawing Sheets

(56) References Cited

U.S. PATENT DOCUMENTS

2024/0069721 A1* 2/2024 Sankaranarayanan ........................ G06F 13/1657
2024/0070065 A1* 2/2024 Hoang ................ G06F 12/0292

* cited by examiner

FLASH INTERFACE WITH SWITCHING LOGIC

CROSS-REFERENCE TO RELATED APPLICATIONS

This application claims benefit of U.S. Provisional Patent Application Ser. No. 63/455,395, filed Mar. 29, 2023, which is herein incorporated by reference.

BACKGROUND OF THE DISCLOSURE

Field of the Disclosure

Embodiments of the present disclosure generally relate to data storage devices, such as solid state drives (SSDs), and, more specifically, operations associated with data relocation transfers between dies.

Description of the Related Art

During operations of a data storage device, data may be moved from a source block of a memory device to a destination block of the memory device as part of a data relocation transfer command. For example, data management operations, such as wear leveling, garbage collection, and the like may cause data to be moved from the source block memory device to the destination block. Likewise, there may be data management operations initiated by a host device coupled to the data storage device to move data from the source block to the destination block. When data is moved from the source block to the destination block, data is read from the source block to a system memory of a controller of the data storage device and then programmed from the system memory to the destination block.

The movement of data from the source block to the destination block generally requires controller intervention (e.g., utilizing the system memory of the controller). Likewise, on-chip-copy is a data relocation scheme where data from a source block can be relocated to a destination block assuming that the source block and the destination block are within the same die. However, if the source block and the destination block are not within the same die, then the data relocation process requires controller intervention. Because controller intervention is required in current data relocation transfer processes, relocating data from a source block to a destination block of a different die may have a high latency and require a large amount of controller bandwidth.

Therefore, there is a need in the art for an improved operation for data relocation transfers between dies.

SUMMARY OF THE DISCLOSURE

The present disclosure generally relates to data storage devices, such as SSDs, and, more specifically, operations associated with data relocation transfers between dies. There is a large latency and controller bandwidth associated with moving data between dies or between memory devices. The controller includes one or more flash interface modules (FIMs) that are utilized to write data to the memory device and read data from the memory device. Each of the one or more FIMs includes one or more switches. Each switch is utilized to transfer data from a source block to a destination block. Likewise, rather than using a memory external to the FIM to cache the data, the data is stored in a FIM cache and moved from the FIM cache to the relevant physical layer to be programmed to the destination block. Because data is not being transferred to the system memory, the latency and bandwidth associated with relocating data may be decreased.

In one embodiment, a data storage device includes a memory device and a controller coupled to the memory device. The controller includes a system memory and a FIM coupled to the system memory. The FIM includes a switch coupled to a physical layer (PHY). The switch is configured to move data from a die of the memory device via the PHY and to another die of the memory device via the PHY.

In another embodiment, a data storage device includes a memory device and a controller coupled to the memory device. The controller includes a system memory and a plurality of FIMs coupled to the system memory and the memory device. Each of the plurality of FIMs includes one or more switches. The controller is configured to transfer data between dies associated with a same FIM without using system memory and transfer data between dies associated with different FIMs without using the system memory.

In another embodiment, a data storage device includes means for storing data and a controller coupled to the means for storing data. The controller includes a system memory and one or more FIMs coupled to the system memory and the means for storing data. The one or more FIMs are configured to move data from a source location of the means for storing data to a destination location of the means for storing data without using the system memory.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as SSDs, and, more specifically, operations associated with data relocation transfers between dies. There is a large latency and controller bandwidth associated with moving data between dies or between memory devices. The controller includes one or more flash interface modules (FIMs) that are utilized to write data to the memory device and read data from the memory device. Each of the one or more FIMs includes one or more switches. Each switch is utilized to transfer data from a source block to a destination block. Likewise, rather than using a memory external to the FIM to cache the data, the data is stored in a FIM cache and moved from the FIM cache to the relevant physical layer to be programmed to the destination block. Because data is not being transferred to the system memory, the latency and bandwidth associated with relocating data may be decreased.

Figure 1:
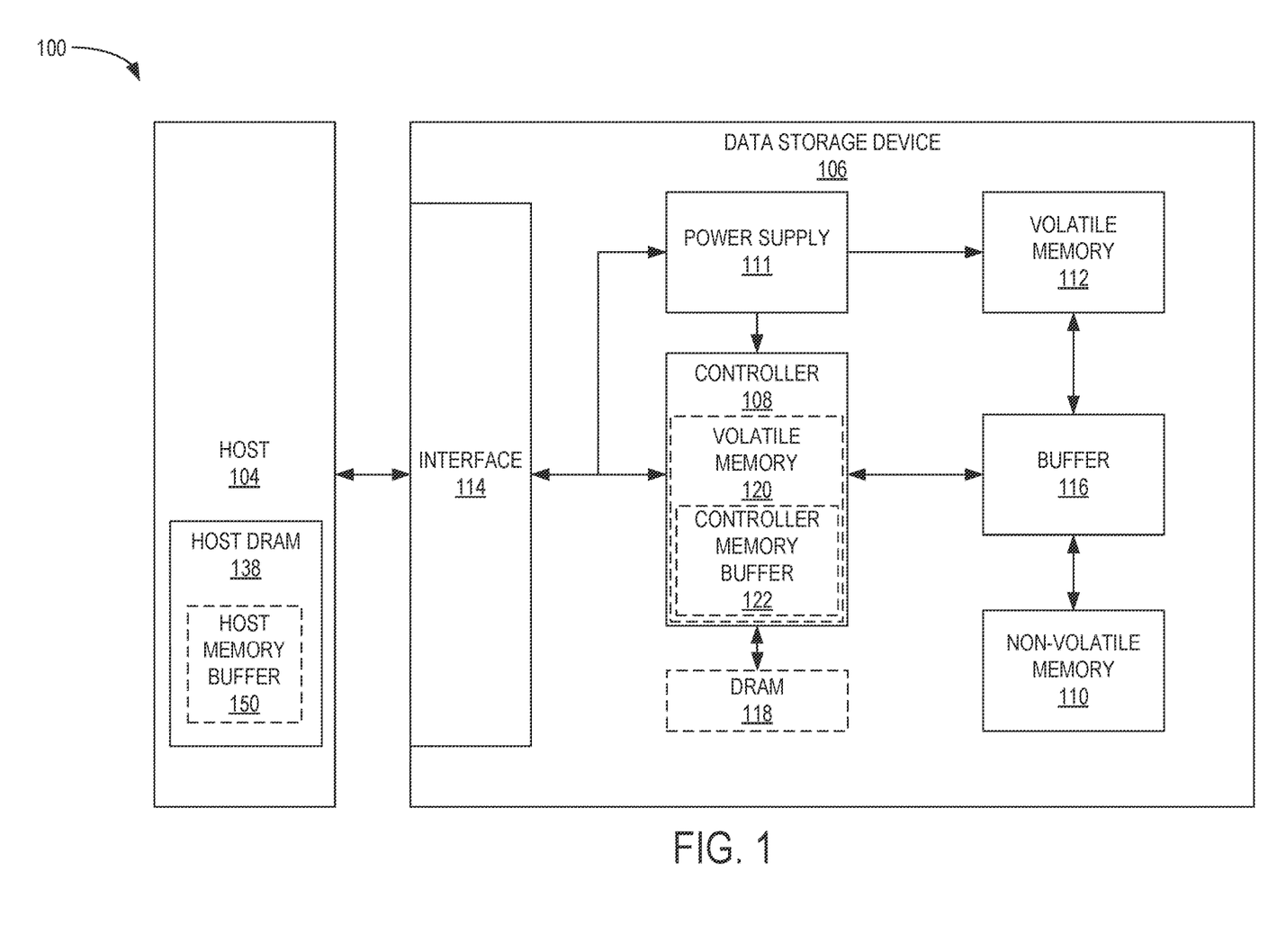
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory 120 to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
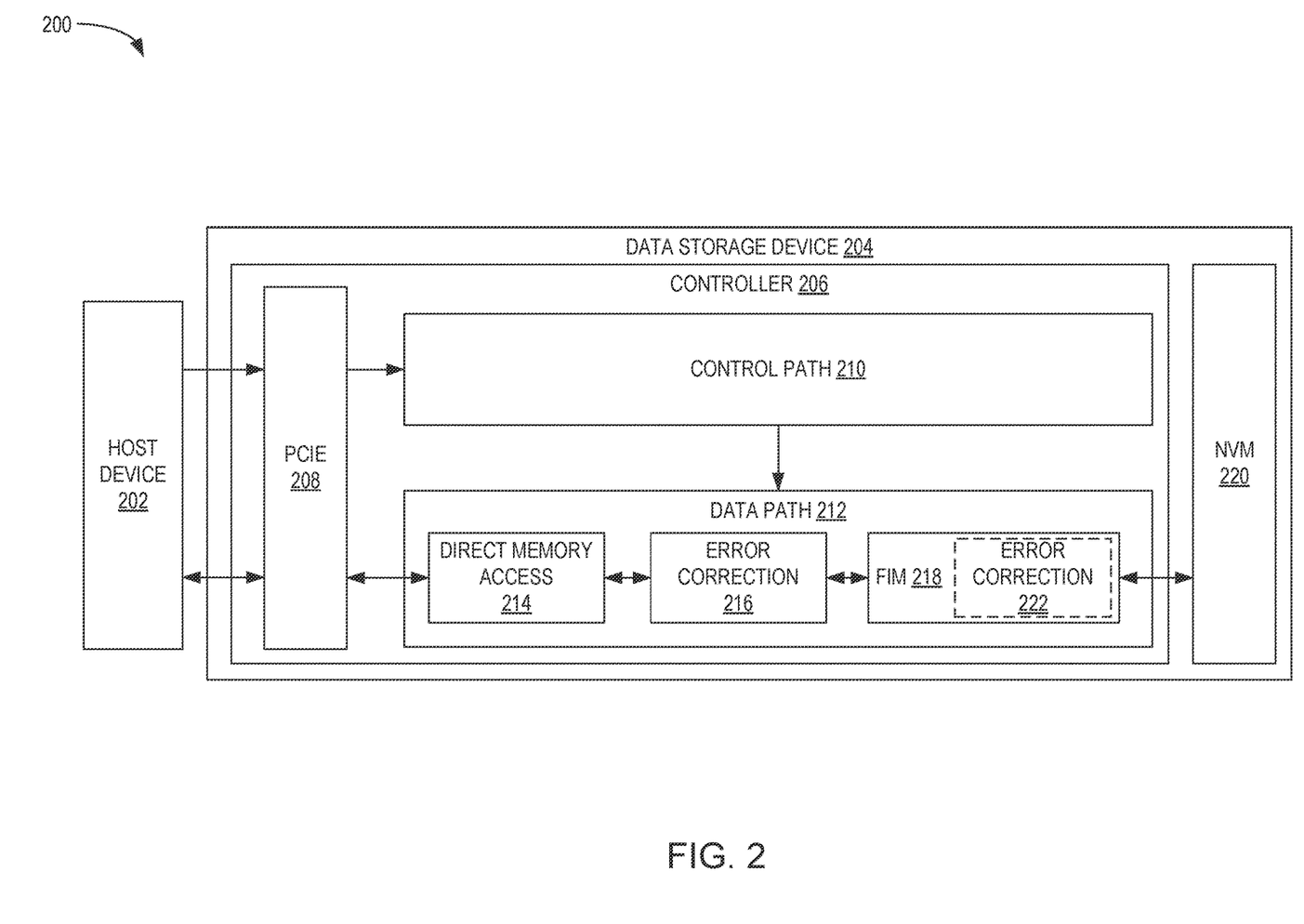
FIG. 2 is a schematic block diagram illustrating a storage system in which a data storage device may function as a storage device for a host device, according to certain embodiments.

FIG. 2 is a schematic block diagram illustrating a storage system 200 in which a data storage device 204 may function as a storage device for a host device 202, according to certain embodiments. Storage system 200 may be the storage system 100 of FIG. 1. The data storage device 204 is coupled to the host device 202. The data storage device includes a controller 206 and an NVM 220. The controller 206 includes a peripheral component interconnect (PCI) express (PCIe) interface 208, which may be a host interface module (HIM), a control path 210, and a data path 212. Control path 210 may include one or more processors, one or more tables, and the like. Data path 212 includes a direct memory access (DMA) module 214, an error correction module 216, and a flash interface module (FIM) 218. The FIM 218 may include a low gear error correction module 222.

When a command is received at the PCIe interface 208 from the host device 202, the command is transferred to the control path 210. If the command includes data, then the data is transferred to the data path 212. The control path 210 may be configured to process the command, generate the relevant additional data storage device commands, perform the relevant computations, retrieve the relevant table entries, and the like. After processing the command, the control path 210 passes instructions to the data path 212.

If data was received by the controller 206 from the host device 202, then the data is passed from the DMA module 214 to the error correction module 216 to be encoded and from the error correction module 216 to the FIM 218. The data is programmed to the NVM 220 from the FIM 218. Likewise, if the command received is a read command, the data is read from the NVM 220 and transferred to the FIM 218, transferred from the FIM 218 to the error correction module 216 to be decoded, and transferred from the error correction module 216 to the DMA module 214. The data is then transferred to the host device 202 through the PCIe interface 208. In certain data relocation transfer operations, such as garbage collection, wear leveling, and the like, the FIM 218 may be utilized to transfer the data from a source block to a destination block of the NVM 220. In some examples, the controller 206 may temporarily store or cache the data being moved in a volatile memory of the controller 206, such as the optional second volatile memory 120, where the optional second volatile memory 120 is external to the FIM 218. In other examples, the controller 206 may temporarily store or cache the data being moved in a volatile memory of the FIM 218. The low gear error correction module 222 may be configured to perform basic decoding and error correction, such as single bit error correction encoding and decoding.

Figure 3:
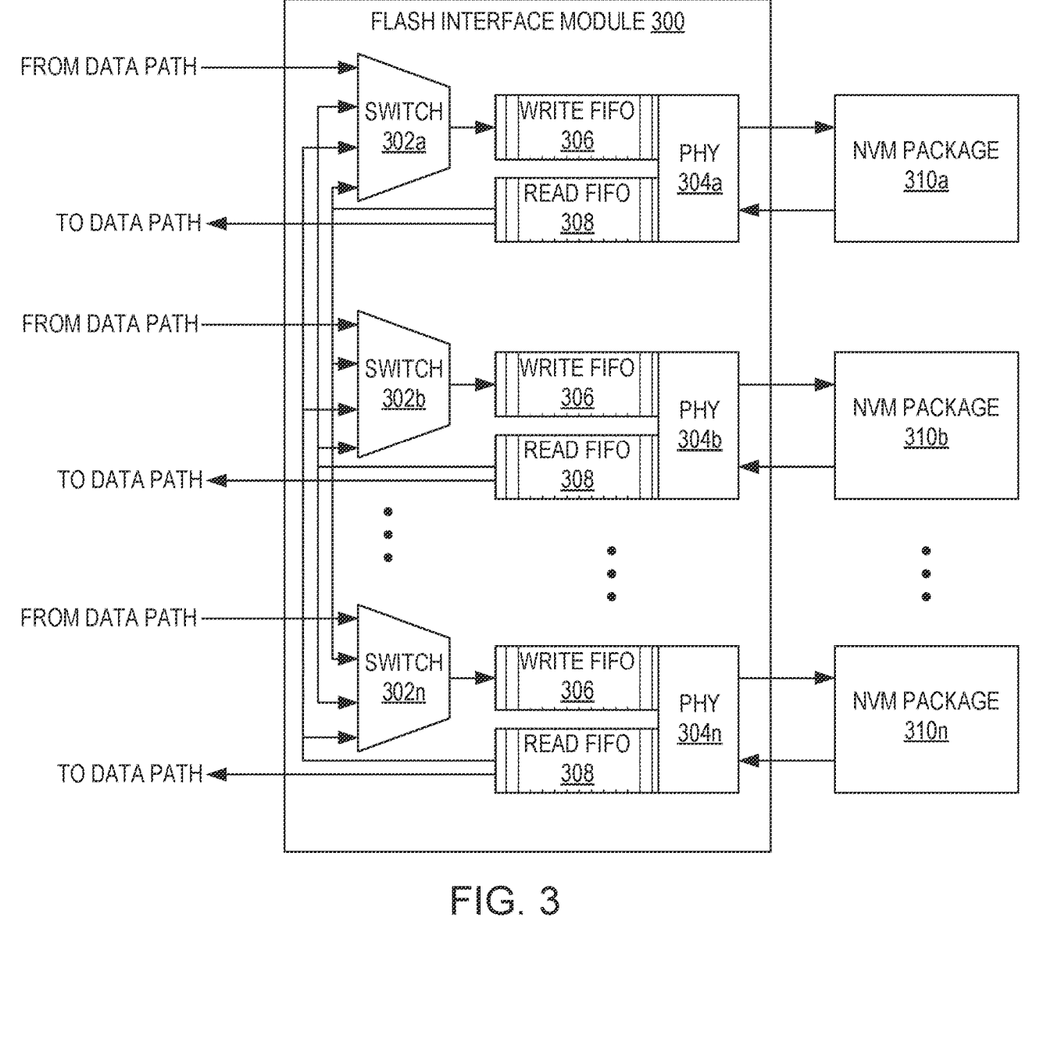
FIG. 3 is schematic block diagram of a flash interface module capable of moving data from a first non-volatile memory (NVM) package to a second NVM package, according to certain embodiments.

FIG. 3 is schematic block diagram of a FIM 300 capable of moving data from a first NVM package 310a to a second NVM package 310n, according to certain embodiments. FIM 300 may be the FIM 218 of FIG. 2. FIM 300 is coupled to a plurality of NVM packages 310a-310n, where each of the plurality of NVM packages 310a-310n is coupled to a respective physical layer (PHY) of a plurality of PHYs 304a-304n. It is to be understood that the FIM 300 may include other components not shown for simplification purposes, such as a FIM cache and/or a low gear error correction module. Furthermore, reference to "data path" may refer to a component coupled to the FIM 300, such as the error correction module 216 of FIG. 2.

FIM 300 includes a plurality of switches 302a-302n, where each switch 302a-302n is configured to send data to a respective PHY of the plurality of PHYs 304a-304n as well as receive data from each of the plurality of PHYs 304a-304n. A controller, such as the controller 206 of FIG. 2, may enable a respective switch, such that data may be transmitted via the switch to a destination NVM package. When data is sent from a switch, such as a first switch 302a, to a respective PHY, such as a first PHY 304a, the data is transmitted to a write first-in first-out (FIFO) queue 306 associated with the respective PHY. Likewise, when data is sent from a PHY, such as the first PHY 304a, to one or more of the plurality of switches 302a-302n to be programmed to a different die of a same NVM package or to a different NVM package or from the PHY to the data path, the data is transmitted to a read FIFO queue 308 coupled to the PHY.

When data is moved from a source die to a destination die of a same NVM package or from a source die to a destination die of a different NVM package, the data may be moved without utilizing an external system memory, such as the optional second volatile memory 120 of FIG. 1. In other words, the data may be maintained within the FIM 300 or, in cases where data is being moved between FIMs, the data may be transferred from one FIM directly to another FIM without utilizing the external system memory to cache the data. Each of the plurality of switches 302a-302n may be configured to perform a variety of functions to reduce controller overheads specifically related to in-memory compute operations where data form one die needs to be transferred to another die for computations. Furthermore, each of the plurality of switches 302a-302n may be configured to perform abstract tasks, such as a Find Last Good Page (FLGP) identification operations, where the last programmed location with proper data in the NVM package is located after an ungraceful shutdown event, and read scrub operations where there are no major logical decisions to be taken. For example, each of the plurality of switches 302a-302n may be configured to perform abstract tasks that do not require a flash translation layer (FTL) interference at a micro-level.

In some examples, the receiver (RX) path (e.g., read FIFO queue 308) and transmit (TX) path (e.g., write FIFO queue 306) may be simultaneously enabled for the transfer of data from one die to another die. Furthermore, the TX path interface may be enabled to check if the data is available in the relevant read FIFO queue 308 and push the data, if available in the relevant read FIFO queue 308, to the write FIFO queue 306. Likewise, a controller, such as the controller 108, may enable the receive path to get data from the relevant NVM as per the FIFO size available associated with the relevant switch of the plurality of switches 302a-302n. The controller may also enable the transmit interface to check whether the data is available in the receive FIFO queue 308 and push the data, if available in the read FIFO queue 308, to the required write FIFO queue 306.

The controller may utilize the plurality of switches 302a-302n to find a last good page, where the controller issues a read sequence to a plurality of ides and the data of the dies may be checked for a respective syndrome weight using the low gear error correction module 222. A consolidated result (i.e., offset in a block) may be sent to the controller with the least controller interference during device initialization. Likewise, data transfers from one die to another die, either via the same FIM or a different FIM, may bypass the other components of the controller and improve the quality of service of the data storage device.

Figure 4:
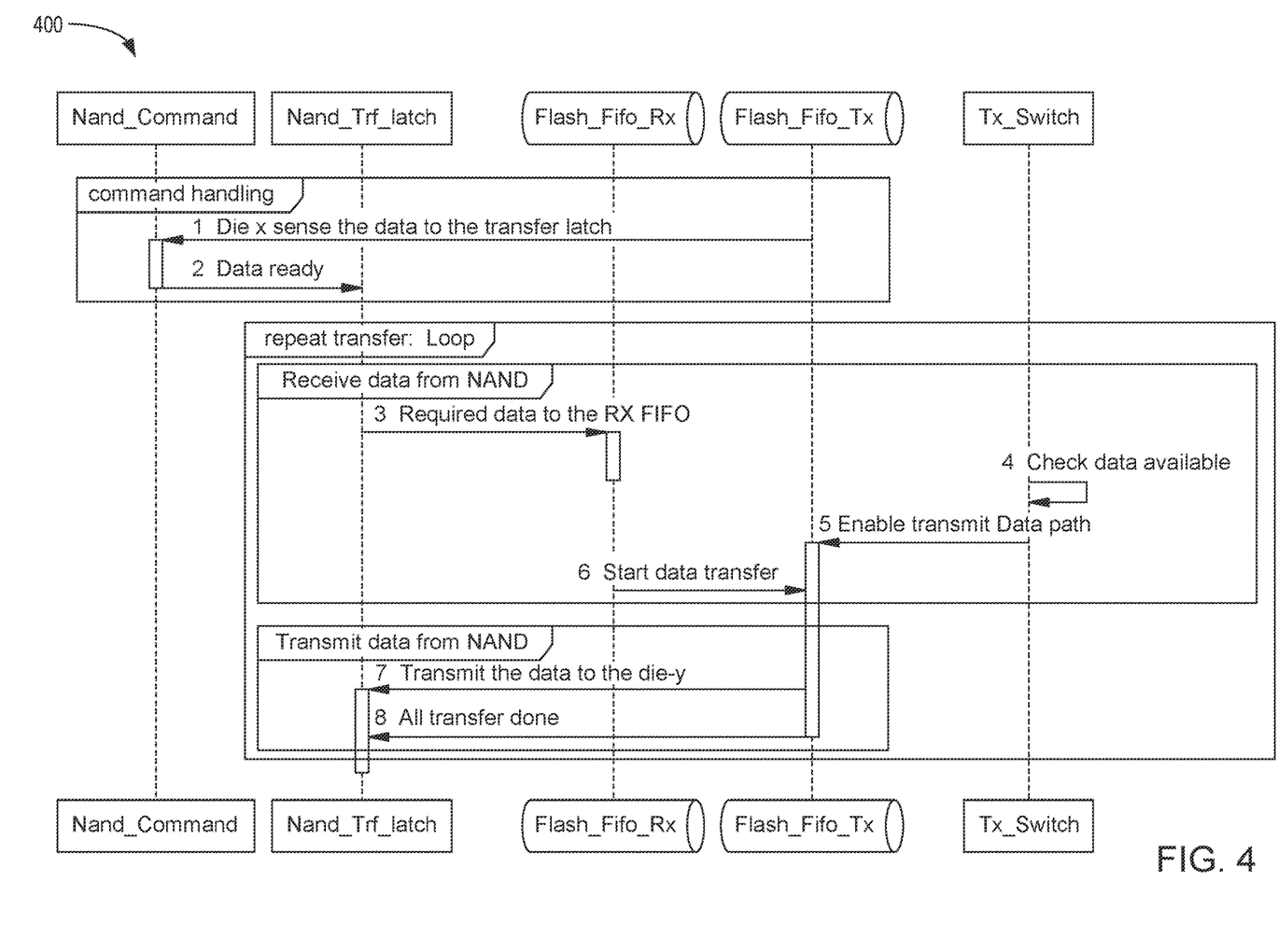
FIG. 4 is a flow diagram illustrating off-chip data movement without processing in a flash interface module (FIM), according to certain embodiments.

FIG. 4 is a flow diagram 400 illustrating off-chip data movement without processing in a FIM, such as the FIM 300 of FIG. 3, according to certain embodiments. For exemplary purposes, aspects of FIG. 3 may be referenced herein. Flow diagram 400 shows an exemplary embodiment of the data movement through various interfaces. Tx_Switch may refer to one of the plurality of switches 302a-302n, Flash_Fifo_Tx may refer to the write FIFO queue 306, Flash_Fifo_Rx may refer to the read FIFO queue 308, Nand_Trf_latch may refer to a latch of a corresponding NVM package, and Nand_Command may refer to the command provided to the relevant NVM package to transfer the data from the corresponding location of the NVM package to the Nand_Trf_latch.

At step 1, a controller, such as the controller 206 of FIG. 2, senses die x and transfers the data to the transfer latch (i.e., Nand_Trf_latch). At step 2, the data is ready at the Nand_Trf_latch. At step 3, the required data is sent to the Flash_Fifo_Rx. At step 4, the Tx_switch determines if the data is available in the Flash_Fifo_Rx. At step 5, the controller enables the relevant transmit path (i.e., enables which data path and a corresponding switch) to send the data to. At step 6, the data transfer begins by sending the data through the Flash_Fifo_Rx to the relevant switch and from the relevant switch to the Flash_Fifo_Tx. At step 7, the data is transmitted from the Flash_Fifo_Tx to relevant Nand_Tx_latch. At step 8, all transfers are completed.

Figure 5:
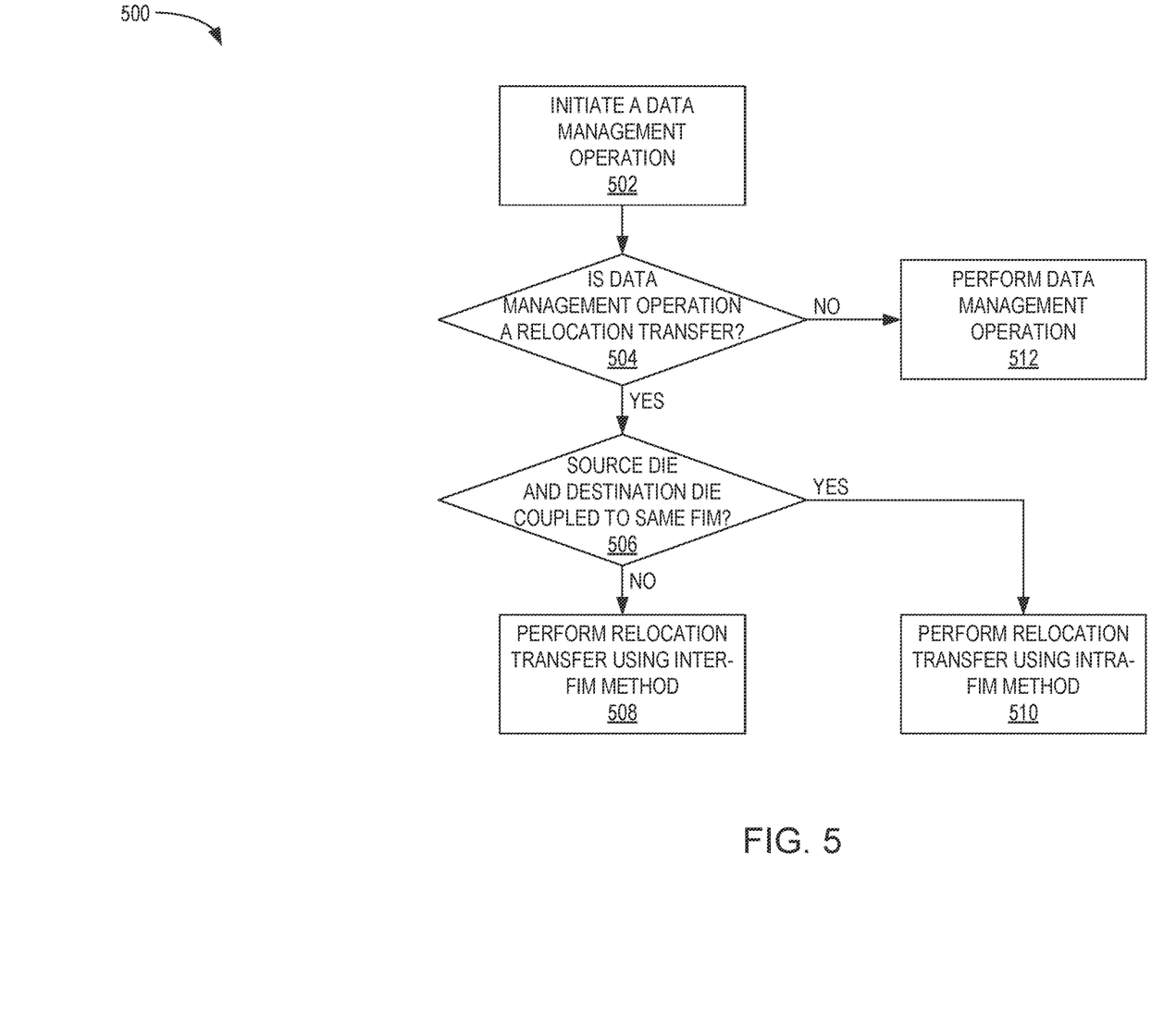
FIG. 5 is a flow diagram illustrating a method of determining whether to perform a relocation transfer using an inter-FIM method or an intra-FIM method, according to certain embodiments.

FIG. 5 is a flow diagram illustrating a method 500 of determining whether to perform a relocation transfer using an inter-FIM method or an intra-FIM method, according to certain embodiments. Method 500 may be implemented by a controller, such as the controller 206 of FIG. 2. For exemplary purposes, aspects of the storage system 200 of FIG. 2 may be referenced herein.

At block 502, the controller 206 initiates a data management operation. For example, data management operations may include garbage collection, wear leveling, read-verify, and the like. At block 504, the controller 206 determines if the data management operation is a relocation transfer operation. For example, a relocation transfer operation may include moving data from a first location of the NVM 220 to a second location of the NVM 220 (e.g., from a source die to a destination die, from a source block to a destination block, and the like). If the data management operation is not a relocation transfer operation at block 504, then the controller 206 proceeds and performs the relevant data management operation at block 512.

However, if the data management operation is a relocation transfer operation at block 504, then the controller 206 determines if the source die and the destination die are coupled to the same FIM at block 506. If the source die and the destination FIM are not coupled to the same FIM (i.e., different FIMs) at block 506, then the controller 206 performs the relocation transfer operation using an inter-FIM method at block 508. However, if the source die and the destination die are coupled to the same FIM at block 506, then the controller 206 performs the relocation transfer operation using an intra-FIM method at block 510. Both the inter-FIM method and the intra-FIM may not use system memory, such as the optional second volatile memory 120 of FIG. 1, but rather a FIM cache of the source FIM to cache the data being relocated. In other words, only the resources of the relevant FIMs, and not the resources of the controller 206 outside of the relevant FIMs, are used to perform the relocation transfer operation.

Figure 6:
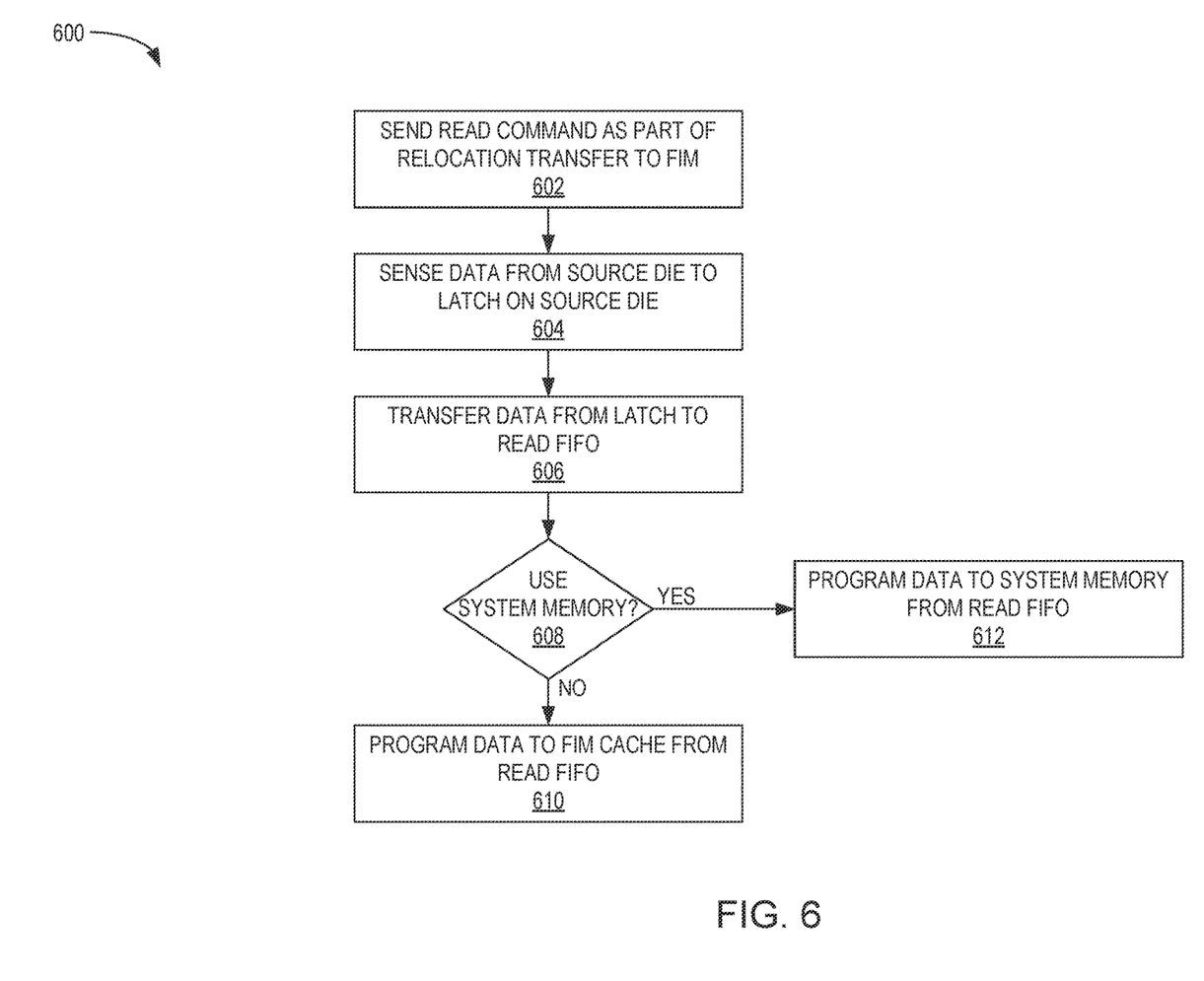
FIG. 6 is a flow diagram illustrating a method of executing a read operation to read data into a FIM cache, according to certain embodiments.

FIG. 6 is a flow diagram illustrating a method 600 of executing a read operation to read data into a FIM cache, according to certain embodiments. Method 600 may be implemented by a controller, such as the controller 206 of FIG. 2. For exemplary purposes, aspects of the storage system 200 of FIG. 2 and aspects of FIG. 3 may be referenced herein.

At block 602, the controller 206 sends a read command as part of a relocation transfer operation to a respective FIM (in multi-FIM systems) or the FIM (in single FIM systems). For example, the FIM may be FIM 300 of FIG. 3. At block 604, the source FIM (i.e., the FIM coupled to the source die) senses the relevant data from a source die (e.g., data from a first NVM package 310) to a latch of the source die. At block 606, the data is transferred from the latch of the source die to the read FIFO queue 308. At block 608, the FIM 300 (or the controller 206) determines whether to use a system memory of the controller 206, such as the optional second volatile memory 120 of FIG. 1, or a FIM cache of the source FIM (i.e., the FIM coupled to the source die). If system memory is used at block 608, then the data is programmed from the read FIFO queue 308 to the system memory (which is external to the source FIM) at block 612. However, if the system memory is not used (i.e., using the FIM cache) at block 608, then the data is programmed to the FIM cache of the source FIM from the read FIFO queue 308 at block 610.

Figure 7:
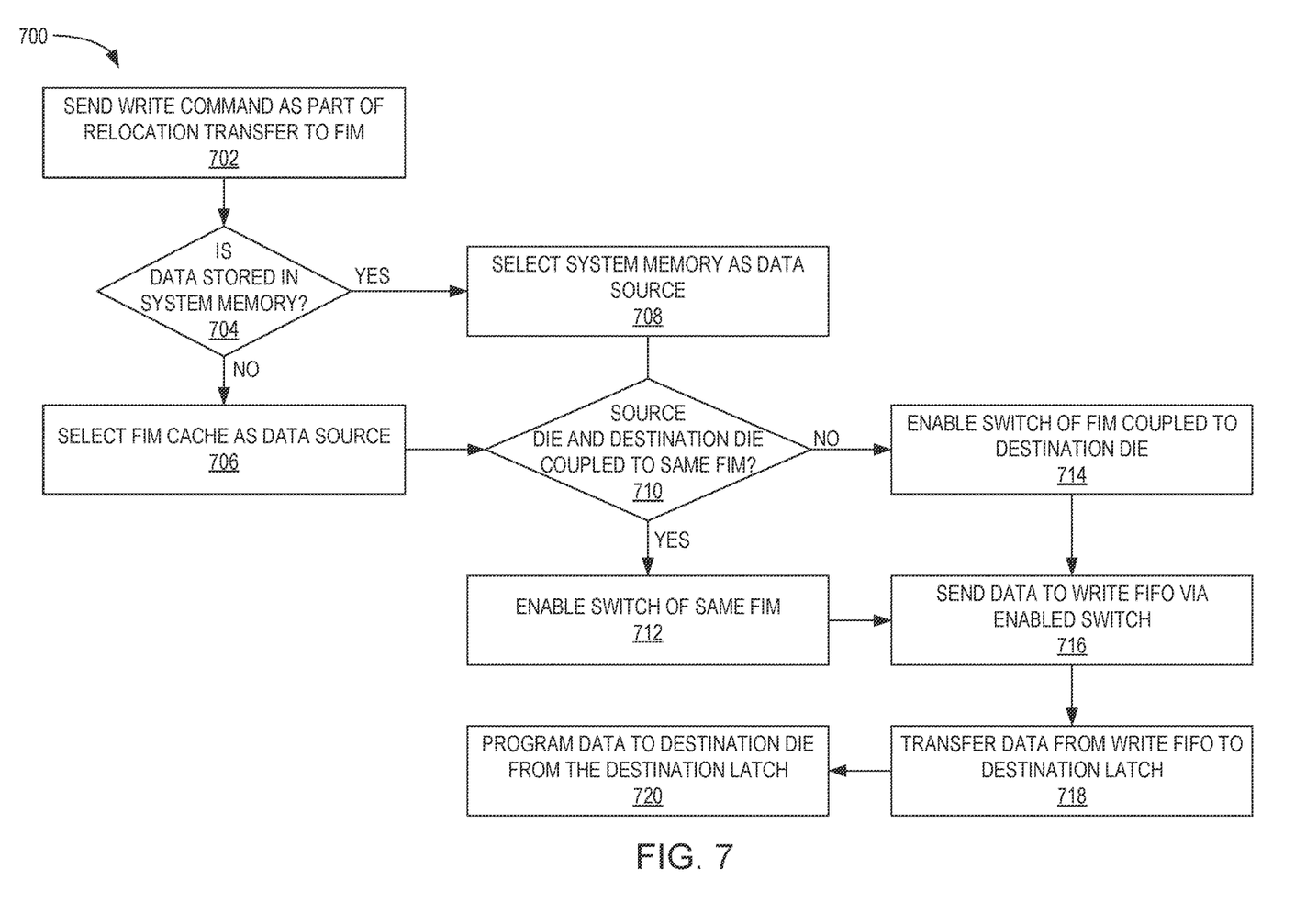
FIG. 7 is a flow diagram illustrating a method of executing a write operation to write data from a FIM cache to a memory device, according to certain embodiments.

FIG. 7 is a flow diagram illustrating a method 700 of executing a write operation to write data from a FIM cache to a memory device, according to certain embodiments. Method 700 may be implemented by a controller, such as the controller 206 of FIG. 2. For exemplary purposes, aspects of the storage system 200 of FIG. 2 and aspects of FIG. 3 may be referenced herein.

At block 702, the controller 206 sends a write command as part of a relocation transfer operation to a respective FIM (in multi-FIM systems) or the FIM (in single FIM systems). For example, the FIM may be FIM 300 of FIG. 3. At block 704, the controller 206 determines if the data associated with the relocation transfer operation is stored in the system memory (e.g., the optional second volatile memory 120 of FIG. 1). If the data is stored in the system memory at block 704, then the controller selects the system memory as the data source at block 708. However, if the data is not stored in the system memory, but rather the source FIM cache, at block 704, then the controller 206 selects the FIM cache as the data source at block 706. At block 710, the controller 206 determines whether the source die and the destination die are coupled to the same FIM. It is to be understood that aspects associated with a single FIM system may be similar to aspects for a multi-FIM system where the source die and the destination die are coupled to the same FIM. In other words, block 712 may refer to a single FIM system or a multi-FIM system where the source die and the destination die are coupled to the same FIM and block 714 may refer to a multi-FIM system.

If the source die and the destination die are coupled to the same FIM at block 710, then the controller 206 enables the corresponding switch (which may be a different switch than the switch coupled to the source die of the same FIM) of the source FIM at block 712. However, if the source die and the destination die are not coupled to the same FIM at block 710, then the controller 206 enables the corresponding switch of the destination FIM coupled to the destination die at block 714. At block 716, the source FIM sends the data to the write FIFO queue 306 via the enabled switch. At block 718, the data is transferred from the write FIFO queue 306 to the destination latch coupled to the destination die. At block 720, the data is programmed to the destination die from the destination latch.

Figure 8:
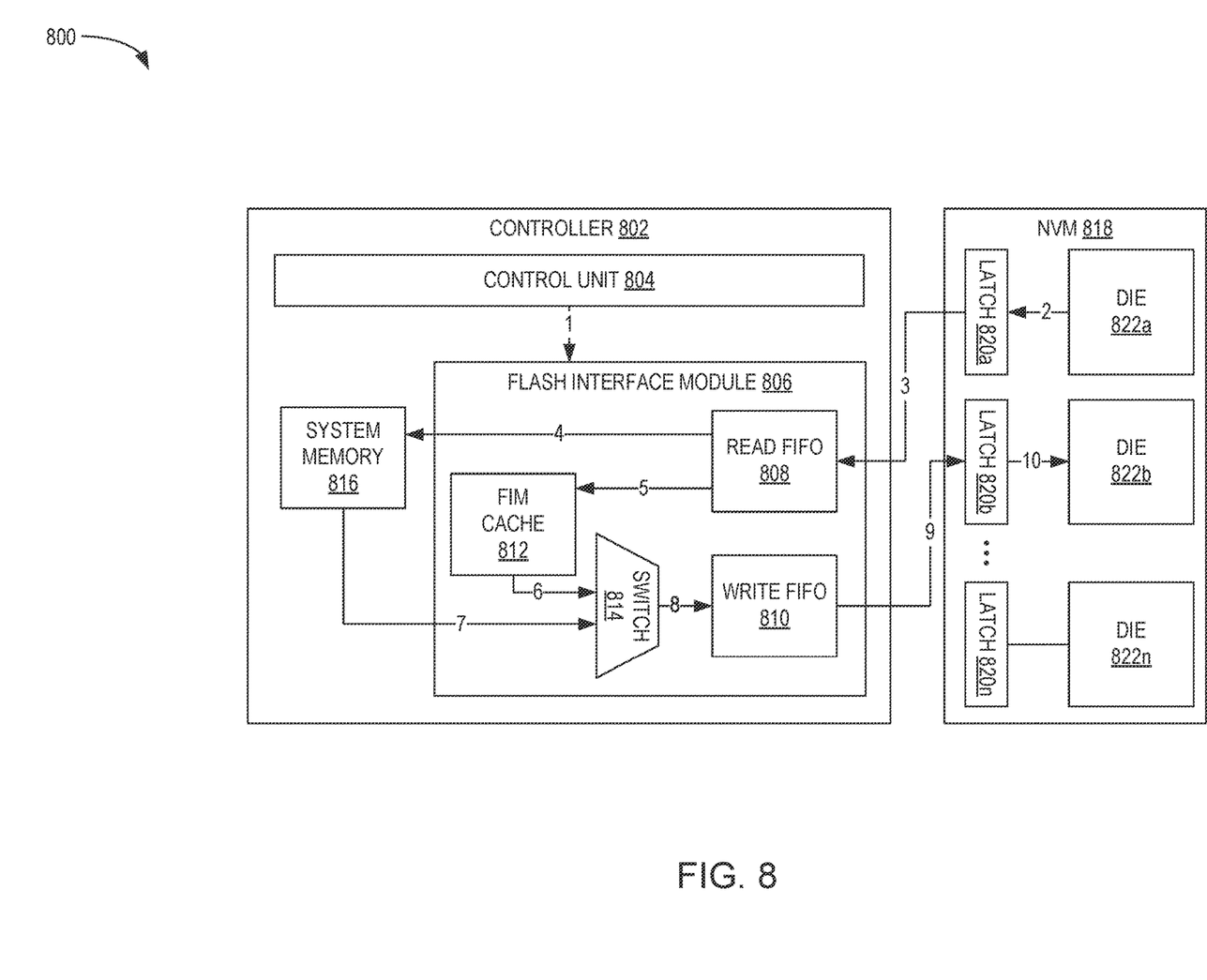
FIG. 8 is a schematic block diagram illustrating a flow of data and commands in a single FIM data storage device, according certain embodiments.

FIG. 8 is a schematic block diagram 800 illustrating a flow of data and commands in a single FIM data storage device, according certain embodiments. Controller 802 is coupled to NVM 818. The controller 802 includes a control unit 804, which may be the control path 210 of FIG. 2, a FIM 806 coupled to the control unit 804, and a system memory 816 coupled to the FIM 806. The FIM 806 includes a read FIFO queue 808, a write FIFO queue 810, a FIM cache 812, and a switch 814. The FIM cache 812 may have a minimum size of about 16 KB. It is to be understood that "about" may refer to a range of plus or minus 5%. The NVM 818 includes a plurality of dies 822a-822n, where each of the plurality of dies 822a-822n are coupled to a respective latch of a plurality of latches 820a-820n. The plurality of latches 820a-820n are coupled to the FIM 806.

At flow 1, the control unit 804 sends a read command, a write command, or both a read command and a write command to the FIM 806. At flow 2, data is sensed from a source die associated with a read command to a latch coupled to the source die. For example, if the read command is for data of the first die 822a, then the data is sensed from the first die 822a to the first latch 820a. At flow 3, the data is transferred from the source latch to the read FIFO queue 808. At flow 4, the data is transferred from the read FIFO queue 808 to the system memory 816.

At flow 5, the data is transferred from the read FIFO queue 808 to the FIM cache 812. At flow 6, the FIM cache 812 is selected as the data source for the data to be programmed to the destination die, where data is transferred from the FIM cache 812 to the switch 814. At flow 7, the system memory 816 is selected as the data source for the data to be programmed to the destination die, where data from the system memory 816 is selected as the input of the switch 814. At flow 8, the source data is transferred from the switch 814 to the write FIFO queue 810. At flow 9, the data is transferred from the write FIFO queue 810 to the relevant destination latch (e.g., the second latch 820b). At flow 10, the data is programmed from the relevant latch (e.g., the second latch 820b) to the destination die (e.g., the second die 822b) coupled to the relevant latch.

In a first data transfer case, where host data is programmed to the NVM 818, the data and commands follow the flow path: 1 to 7 to 8 to 9 to 10. In a second data transfer case, where data is transferred from one die to another die using the system memory 816, the data and commands follow the flow path: 1 to 2 to 3 to 4 to 7 to 8 to 9 to 10. In a third data transfer case, where data is transferred from one die to another die within a same FIM, the data and commands follow the flow path: 1 to 2 to 3 to 5 to 6 to 8 to 9 to 10.

Figure 9:
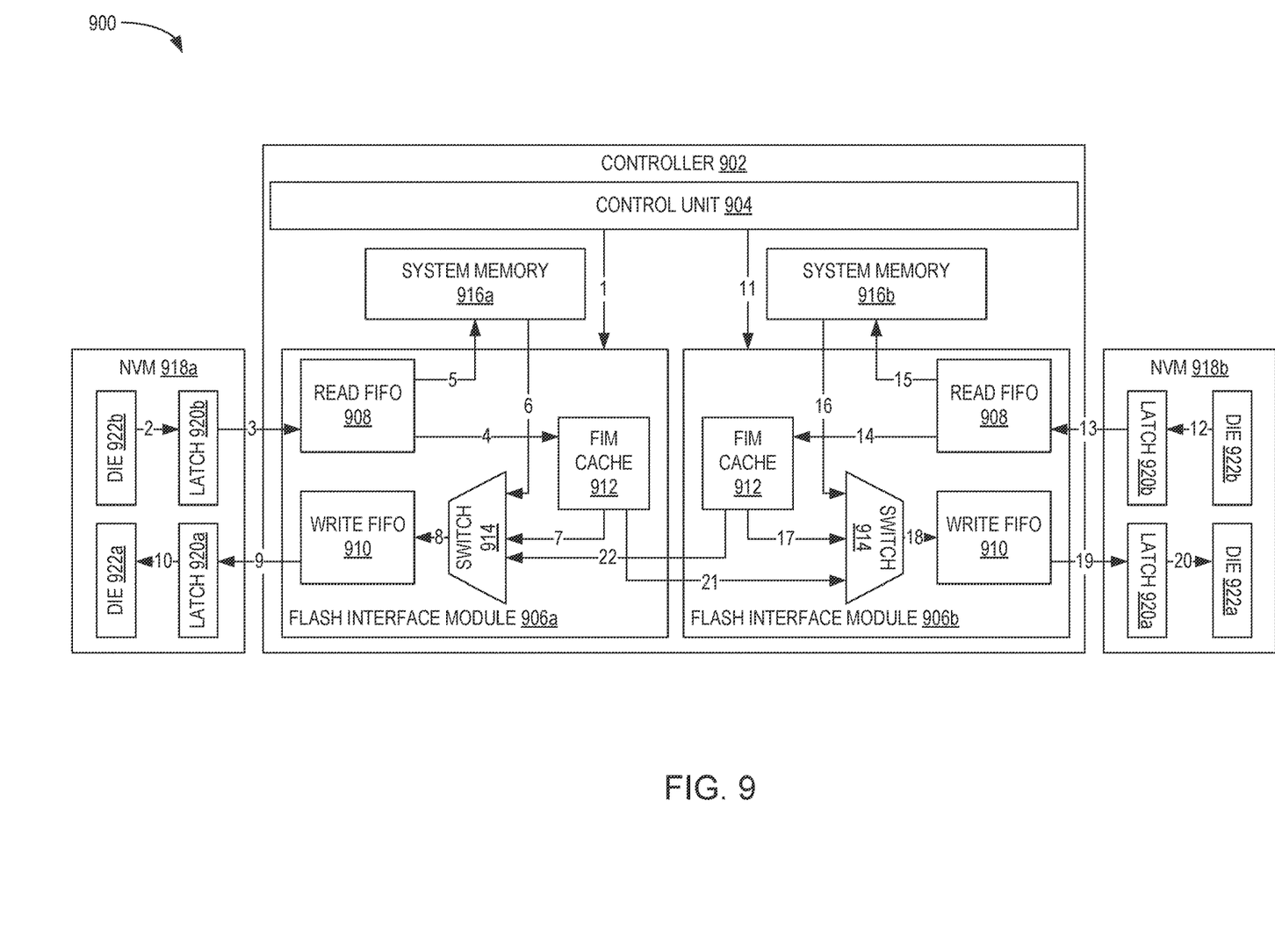
FIG. 9 is a schematic block diagram illustrating a flow of data and commands in a multi-FIM data storage device, according certain embodiments.

FIG. 9 is a schematic block diagram 900 illustrating a flow of data and commands in a multi-FIM data storage device, according certain embodiments. Controller 902 is coupled to a first NVM 918a and a second NVM 918b. The first NVM 918a and the second NVM 918b may be a partition of the same NVM or be distinct NVMs. The controller 902 includes a control unit 904, which may be the control path 210 of FIG. 2, a first FIM 906a coupled to the control unit 904 and a second FIM 906b, where the second FIM 906b is coupled to the control unit 904 and the first FIM 906a, a first system memory 916a coupled to the first FIM 906a, and a second system memory 916b coupled to the second FIM 906b. The first system memory 916a and the second system memory 916b may be a partition of the same system memory or be distinct system memories. Furthermore, each system memory may be coupled to one or more switches of each FIM of the controller 902. The FIMs 906a, 906b each includes a read FIFO queue 908, a write FIFO queue 910, a FIM cache 912, and a switch 914. The FIM cache 912 may have a minimum size of about 16 KB. It is to be understood that "about" may refer to a range of plus or minus 5%. The NVMs 918a, 918b each includes a first die 922a and a second die 922b, where the first die 922a is coupled to the first latch 920a and the second die 922b is coupled to the second latch 920b. The latches 920a, 920b are coupled to a corresponding FIM of the FIMs 906a, 906b. It is to be understood that the number of NVMs, the number of dies, the number of latches, the number of FIMs, and the number of system memories is not intended to be limiting, but to provide an example of a possible embodiment.

At flow 1, the control unit 904 sends a read command, a write command, or both a read command and a write command to the first FIM 906a. At flow 2, data is sensed from a source die associated with a read command to a latch coupled to the relevant die. For example, if the read command is for data of the second die 922n of the first NVM 918a, then the data is sensed from the second die 922b to the second latch 920b of the first NVM 918a. At flow 3, the data is transferred from the source latch (i.e., the second latch 920b of the first NVM 918a) to the read FIFO queue 908 of the first FIM 906a. It is to be understood that the term "source" may refer to an originating location associated with the flow. For example, a source location of flow 5 is the read FIFO 908 of the first FIM 906a. At flow 4, the data is transferred from the read FIFO queue 908 of the first FIM 906a to the FIM cache 912 of the first FIM 906a. At flow 5, the data is transferred from the read FIFO queue 908 of the first FIM 906a to the first system memory 916a. At flow 6, the first system memory 916a is selected as the data source for the data to be programmed to the destination die, where data from the first system memory 916a is selected as the input of the switch 914 of the first FIM 906a. At flow 7, the FIM cache 912 of the first FIM 906a is selected as the data source for the data to be programmed to the destination die, where data is transferred from the FIM cache 912 of the first FIM 906a to the switch 914 of the first FIM 906a. At flow 8, the source data is transferred from the switch 914 of the first FIM 906a to the write FIFO queue 910 of the first FIM 906a. At flow 9, the data is transferred from the write FIFO queue 910 of the first FIM 906a to the relevant destination latch (e.g., the first latch 920a of the first NVM 918a). At flow 10, the data is programmed from the relevant latch (e.g., the first latch 920a of the first NVM 918a) to the destination die (e.g., the first die 922a of the first NVM 918a) coupled to the relevant latch.

At flow 11, the control unit 904 sends a read command, a write command, or both a read command and a write command to the second FIM 906b. At flow 12, data is sensed from a source die associated with a read command to a latch coupled to the relevant die. For example, if the read command is for data of the second die 922n of the second NVM 918b, then the data is sensed from the second die 922b to the second latch 920b of the second NVM 918b. At flow 13, the data is transferred from the source latch (i.e., the second latch 920b of the second NVM 918b) to the read FIFO queue 908 of the second FIM 906b. At flow 14, the data is transferred from the read FIFO queue 908 of the second FIM 906b to the FIM cache 912 of the second FIM 906b. At flow 15, the data is transferred from the read FIFO queue 908 of the second FIM 906b to the second system memory 916b. At flow 16, the second system memory 916b is selected as the data source for the data to be programmed to the destination die, where data from the second system memory 916b is selected as the input of the switch 914 of the second FIM 906b. At flow 17, the FIM cache 912 of the second FIM 906b is selected as the data source for the data to be programmed to the destination die, where data is transferred from the FIM cache 912 of the second FIM 906b to the switch 914 of the second FIM 906b. At flow 18, the source data is transferred from the switch 914 of the second FIM 906b to the write FIFO queue 910 of the second FIM 906b. At flow 19, the data is transferred from the write FIFO queue 910 of the second FIM 906b to the relevant destination latch (e.g., the first latch 920a of the second NVM 918b). At flow 20, the data is programmed from the relevant latch (e.g., the first latch 920a of the second NVM 918b) to the destination die (e.g., the first die 922a of the second NVM 918b) coupled to the relevant latch.

Flow 21 refers to inter-FIM die to die data transfer, where data is moved from the FIM cache 912 of the first FIM 906a to the switch 914 of the second FIM 906b. Likewise, flow 22 refers to inter-FIM die to die data transfer, where data is moved from the FIM cache 912 of the second FIM 906b to the switch 914 of the first FIM 906a.

In a first data transfer case, where host data is programmed to the first NVM 918a, the data and commands follow the flow path: 1 to 6 to 8 to 9 to 10. In a first data transfer case, where host data is programmed to the second NVM 918b, the data and commands follow the flow path: 11 to 16 to 18 to 19 to 20. In a third data transfer case, where data is transferred from one die to another die within a same FIM (e.g., the first FIM 906a), the data and commands follow the flow path: 1 to 2 to 3 to 4 to 7 to 8 to 9 to 10. In a fourth data transfer case, where data is transferred from one die to another die within a same FIM (e.g., the second FIM 906b), the data and commands follow the flow path: 11 to 12 to 13 to 14 to 17 to 18 to 19 to 20. In a fifth data transfer case, where data is transferred from one die of a source FIM (e.g., the first FIM 906a) to another die of a destination FIM (e.g., the second FIM 906b), the data and commands follow the flow path: 1/11 to 2 to 3 to 4 to 21 to 18 to 19 to 20. In a sixth data transfer case, where data is transferred from one die of a source FIM (e.g., the second FIM 906b) to another die of a destination FIM (e.g., the first FIM 906a), the data and commands follow the flow path: 11/1 to 12 to 13 to 14 to 22 to 8 to 9 to 10.

By utilizing switches in the FIM to move data and a FIM cache to temporarily store the data being moved, latency and bandwidth associated with data relocation transfer operations may be decreased, which may data storage device performance.

In one embodiment, a data storage device includes a memory device and a controller coupled to the memory device. The controller includes a system memory and a FIM coupled to the system memory. The FIM includes a switch coupled to a physical layer (PHY). The switch is configured to move data from a die of the memory device via the PHY and to another die of the memory device via the PHY. The FIM further includes a cache. The data is stored in the cache during the moving. The data remains in the FIM during the moving. The controller includes a plurality of FIMs. The another die is associated with another FIM of the plurality of FIMs. The data does not pass through the system memory during the moving. The FIM further includes a low gear error correction engine configured to encode data to be programmed to the another die and decode encoded data received from the die. The controller is configured to enable the switch when the moving occurs. The switch receives the data from a read first-in first-out (FIFO) queue coupled to the PHY. The switch sends the data to the PHY via a write FIFO queue.

In another embodiment, a data storage device includes a memory device and a controller coupled to the memory device. The controller includes a system memory and a plurality of FIMs coupled to the system memory and the memory device. Each of the plurality of FIMs includes one or more switches. The controller is configured to transfer data between dies associated with a same FIM without using system memory and transfer data between dies associated with different FIMs without using the system memory. Transferring the data between the dies associated with the same FIM without using the system memory further includes sensing the data from a source die to a latch of the source die, transferring the data from the latch of the source die to a read first-in first-out (FIFO) queue, and storing the data in a cache of the same FIM from the read FIFO queue. Transferring the data between the dies associated with the same FIM without using the system memory further includes selecting the cache of the same FIM as source data to program to a destination die associated with the same FIM, transferring the data to a write FIFO queue via a switch of the same FIM, where the switch is associated with the destination die, transferring the data from the write FIFO queue to a latch of the destination die, and programming the data to the destination die from the latch of the destination die. Transferring the data between the dies associated with the different FIMs without using the system memory further includes sensing the data from a source die to a latch of the source die associated with a source FIM, transferring the data from the latch of the source die to a read FIFO queue of the source FIM, and storing the data in a cache of the source FIM from the read FIFO queue. Transferring the data between the dies associated with the different FIMs without using the system memory further includes selecting the cache of the source FIM as source data to program to a destination die associated with a destination FIM, transferring the data to a write FIFO queue of the destination FIM associated with the destination die via a switch of the destination FIM, where the switch is associated with the destination die, transferring the data from the write FIFO queue to a latch of the destination die, and programming the data to the destination die from the latch of the destination die. The controller is further configured to determine whether a source FIM and a destination FIM associated with a relocation request is for the same FIM or the different FIMs. The controller is further configured to enable a switch of the same FIM when the source FIM and the destination FIM associated with the relocation request is for the same FIM. Transferring data between the dies associated with the same FIM without using the system memory is responsive to enabling the switch of the same FIM. The controller is further configured to enable a switch of the different FIM when the source FIM and the destination FIM associated with the relocation request are for the different FIMs. Transferring data between the dies associated with the different FIMs without using the system memory is responsive to enabling the switch of the different FIM.

In another embodiment, a data storage device includes means for storing data and a controller coupled to the means for storing data. The controller includes a system memory and one or more FIMs coupled to the system memory and the means for storing data. The one or more FIMs are configured to move data from a source location of the means for storing data to a destination location of the means for storing data without using the system memory.

The system memory is volatile memory. The one or more FIMs comprises one or more switches. Each of the one or more switches are associated with a location of the means for storing data. Moving data from the source location to the destination location includes storing the data from the source location in a source cache. The source cache is disposed in a source FIM associated with the source location and enabling a switch of the one or more switches of a destination FIM. The destination FIM is associated with the destination location. The source FIM and the destination FIM are the same or the source FIM and the destination FIM are different.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
a memory device; and
a controller coupled to the memory device, wherein the controller comprises:

a system memory; and
a flash interface module (FIM) coupled to the system memory, wherein the FIM comprises a switch coupled to a physical layer (PHY), and wherein the switch is configured to move data from a die of the memory device via the PHY and to another die of the memory device via the PHY,
wherein the FIM further comprises a cache, and wherein the data is stored in the cache during the moving.

2. The data storage device of claim 1, wherein the data remains in the FIM during the moving.

3. The data storage device of claim 1, wherein the controller comprises a plurality of FIMs, wherein the another die is associated with another FIM of the plurality of FIMs, and wherein the data does not pass through the system memory during the moving.

4. A data storage device, comprising:
a memory device; and
a controller coupled to the memory device, wherein the controller comprises:
a system memory; and
a flash interface module (FIM) coupled to the system memory, wherein the FIM comprises a switch coupled to a physical layer (PHY), and wherein the switch is configured to move data from a die of the memory device via the PHY and to another die of the memory device via the PHY,
wherein the FIM further comprises a low gear error correction engine, wherein the low gear error correction engine is configured to:
encode data to be programmed to the another die; and
decode encoded data received from the die.

5. The data storage device of claim 1, wherein the controller is configured to:
enable the switch when the moving occurs.

6. A data storage device, comprising:
a memory device; and
a controller coupled to the memory device, wherein the controller comprises:
a system memory; and
a flash interface module (FIM) coupled to the system memory, wherein the FIM comprises a switch coupled to a physical layer (PHY), and wherein the switch is configured to move data from a die of the memory device via the PHY and to another die of the memory device via the PHY,
wherein the switch receives the data from a read first-in first-out (FIFO) queue coupled to the PHY.

7. A data storage device, comprising:
a memory device; and
a controller coupled to the memory device, wherein the controller comprises:
a system memory; and
a flash interface module (FIM) coupled to the system memory, wherein the FIM comprises a switch coupled to a physical layer (PHY), and wherein the switch is configured to move data from a die of the memory device via the PHY and to another die of the memory device via the PHY,
wherein the switch sends the data to the PHY via a write FIFO queue.

8. A data storage device, comprising:
a memory device;
a controller coupled to the memory device, wherein the controller comprises:

a system memory;
a plurality of flash interface modules (FIMs) coupled to the system memory and the memory device, wherein each of the plurality of FIMs comprises one or more switches, and wherein the controller is configured to:
transfer data between dies associated with a same FIM without using the system memory; and
transfer data between dies associated with different FIMs without using the system memory.

9. The data storage device of claim 8, wherein transferring the data between the dies associated with the same FIM without using the system memory further comprises:
sensing the data from a source die to a latch of the source die;
transferring the data from the latch of the source die to a read first-in first-out (FIFO) queue; and
storing the data in a cache of the same FIM from the read FIFO queue.

10. The data storage device of claim 9, wherein transferring the data between the dies associated with the same FIM without using the system memory further comprises:
selecting the cache of the same FIM as source data to program to a destination die associated with the same FIM;
transferring the data to a write FIFO queue via a switch of the same FIM, wherein the switch is associated with the destination die;
transferring the data from the write FIFO queue to a latch of the destination die; and
programming the data to the destination die from the latch of the destination die.

11. The data storage device of claim 8, wherein transferring the data between the dies associated with the different FIMs without using the system memory further comprises:
sensing the data from a source die to a latch of the source die associated with a source FIM;
transferring the data from the latch of the source die to a read FIFO queue of the source FIM; and
storing the data in a cache of the source FIM from the read FIFO queue.

12. The data storage device of claim 11, wherein transferring the data between the dies associated with the different FIMs without using the system memory further comprises:
selecting the cache of the source FIM as source data to program to a destination die associated with a destination FIM;
transferring the data to a write FIFO queue of the destination FIM associated with the destination die via a switch of the destination FIM, wherein the switch is associated with the destination die;
transferring the data from the write FIFO queue to a latch of the destination die; and
programming the data to the destination die from the latch of the destination die.

13. The data storage device of claim 8, wherein the controller is further configured to:
determine whether a source FIM and a destination FIM associated with a relocation request is for the same FIM or the different FIMs.

14. The data storage device of claim 13, wherein the controller is further configured to:
enable a switch of the same FIM when the source FIM and the destination FIM associated with the relocation request is for the same FIM, wherein transferring data between the dies associated with the same FIM without using the system memory is responsive to enabling the switch of the same FIM.

15. The data storage device of claim 13, wherein the controller is further configured to:
enable a switch of the different FIM when the source FIM and the destination FIM associated with the relocation request are for the different FIMs, wherein transferring data between the dies associated with the different FIMs without using the system memory is responsive to enabling the switch of the different FIM.

16. A data storage device, comprising:
means for storing data; and
a controller coupled to the means for storing data, wherein the controller comprises:
a system memory; and
one or more flash interface modules (FIMs) coupled to the system memory and the means for storing data, wherein the FIM further comprises a cache, and wherein the one or more FIMs are configured to:
move data from a source location of the means for storing data to a destination location of the means for storing data without using the system memory, wherein the data is stored in the cache during the moving.

17. The data storage device of claim 16, wherein the system memory is volatile memory.

18. The data storage device of claim 16, wherein the one or more FIMs comprises one or more switches, wherein each of the one or more switches are associated with a location of the means for storing data.

19. A data storage device, comprising:
means for storing data; and
a controller coupled to the means for storing data, wherein the controller comprises:
a system memory; and
one or more flash interface modules (FIMs) coupled to the system memory and the means for storing data, wherein the one or more FIMs are configured to:
move data from a source location of the means for storing data to a destination location of the means for storing data without using the system memory, wherein moving data from the source location to the destination location comprises:
storing the data from the source location in a source cache, wherein the source cache is disposed in a source FIM associated with the source location; and
enabling a switch of the one or more switches of a destination FIM, wherein the destination FIM is associated with the destination location, and wherein:
the source FIM and the destination FIM are the same; or
the source FIM and the destination FIM are different.

20. The data storage device of claim 19, wherein the one or more FIMs each comprise a write first in first out (FIFO) queue and a read FIFO queue.

* * * * *